United States Patent
Springer

(10) Patent No.: US 6,435,794 B1
(45) Date of Patent: Aug. 20, 2002

(54) FORCE DISPLAY MASTER INTERFACE DEVICE FOR TELEOPERATION

(76) Inventor: Scott L. Springer, 317 Park Cir., Menomonie, WI (US) 54751

(*) Notice: Subject to any disclaimer, the term of this patent is extended or adjusted under 35 U.S.C. 154(b) by 0 days.

(21) Appl. No.: 09/896,674

(22) Filed: Jun. 29, 2001

Related U.S. Application Data

(63) Continuation-in-part of application No. 09/195,318, filed on Nov. 18, 1998.

(51) Int. Cl.[7] .................................................. B25J 3/00
(52) U.S. Cl. ........................ 414/5; 414/730; 340/407.1; 703/5; 703/7; 600/595
(58) Field of Search ........................... 414/5, 730, 800; 340/407.1; 703/5, 7; 600/595

(56) References Cited

U.S. PATENT DOCUMENTS

| | | | | |
|---|---|---|---|---|
| 3,263,824 A | * | 8/1966 | Jones et al. ..................... 414/5 |
| 3,915,153 A | * | 10/1975 | Quinn ........................ 414/5 X |
| 3,952,880 A | * | 4/1976 | Hill et al. ....................... 414/5 |
| 4,302,138 A | * | 11/1981 | Zarudiansky .................. 414/5 |
| 4,510,574 A | * | 4/1985 | Guittet et al. ............... 414/5 X |
| 4,655,673 A | * | 4/1987 | Hawkes ...................... 414/5 X |
| 4,988,981 A | * | 1/1991 | Zimmerman et al. ....... 345/158 |
| 5,072,361 A | * | 12/1991 | Davis et al. ................. 414/5 X |
| 5,184,319 A | * | 2/1993 | Kramer ...................... 414/5 X |
| 5,354,162 A | * | 10/1994 | Burdea et al. .................. 414/5 |
| 5,587,937 A | * | 12/1996 | Massie et al. .................. 703/7 |
| 5,631,861 A | * | 5/1997 | Kramer ...................... 414/5 X |
| 5,676,157 A | * | 10/1997 | Kramer ....................... 600/595 |
| 6,042,555 A | * | 3/2000 | Kramer et al. .............. 600/595 |
| 6,059,506 A | * | 5/2000 | Kramer .......................... 414/5 |
| 6,110,130 A | * | 8/2000 | Kramer ....................... 600/595 |

* cited by examiner

*Primary Examiner*—Robert P. Olszewski
*Assistant Examiner*—Gerald J. O'Connor

(57) ABSTRACT

A force display master interface is provided for interaction with teleoperated robotic slave manipulators or virtual slave entities. The device provides a de-coupled actuator that permits selective engagement between the actuator and the fingertip. A method for high speed control of force display masters is disclosed, which includes determination of a pre-contact state of the slave entity and an object in the slave environment. Operation on the pre-contact state information is used to pre-position the actuator into an appropriate position to represent the contact to the operator, before slave contact is made. In one embodiment, the force display master provides a hand mounted linkage assembly, in combination with a remote control assembly that measures fingertip motion and selectively provides resistance thereto. In another embodiment the invention includes general linkage-actuator arrangements that can be used singly or in combination to provide a variety of master interface devices.

17 Claims, 11 Drawing Sheets

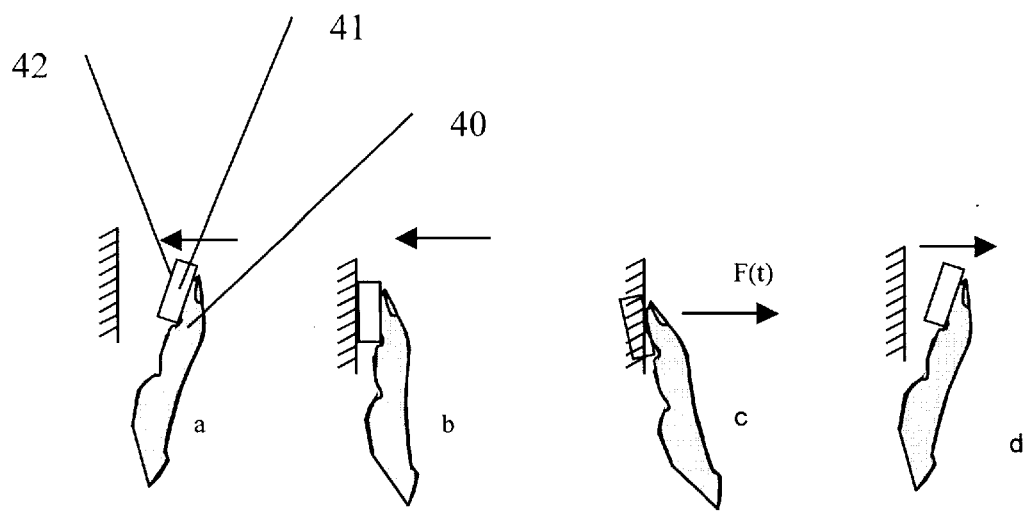

| Attach bounding box to fingertip contact drum leads rep. finger by $\gamma = \beta + \alpha_{max}$ | Upon BB contact with virtual surface $\alpha = \alpha^*$ freeze contact drum at $\gamma^* = \alpha^* + \beta$ If $\alpha < \alpha^*$ and previous $\alpha > \alpha^*$ set $\gamma^*$ | If $\alpha < \alpha^*$ position control $\gamma$ to $\gamma = \gamma^*$ After fingertip contacts object switch to force control | Should operator retract finger between 2 and 3, $\alpha > \alpha^*$ so reset contact drum to $\gamma = \beta + \alpha_{max}$ tracking mode |

FIGURE 6

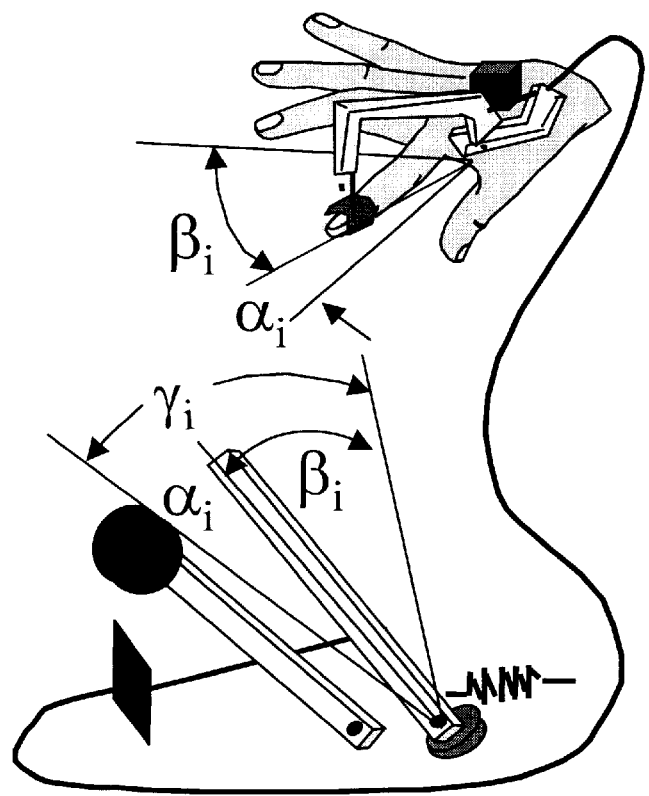
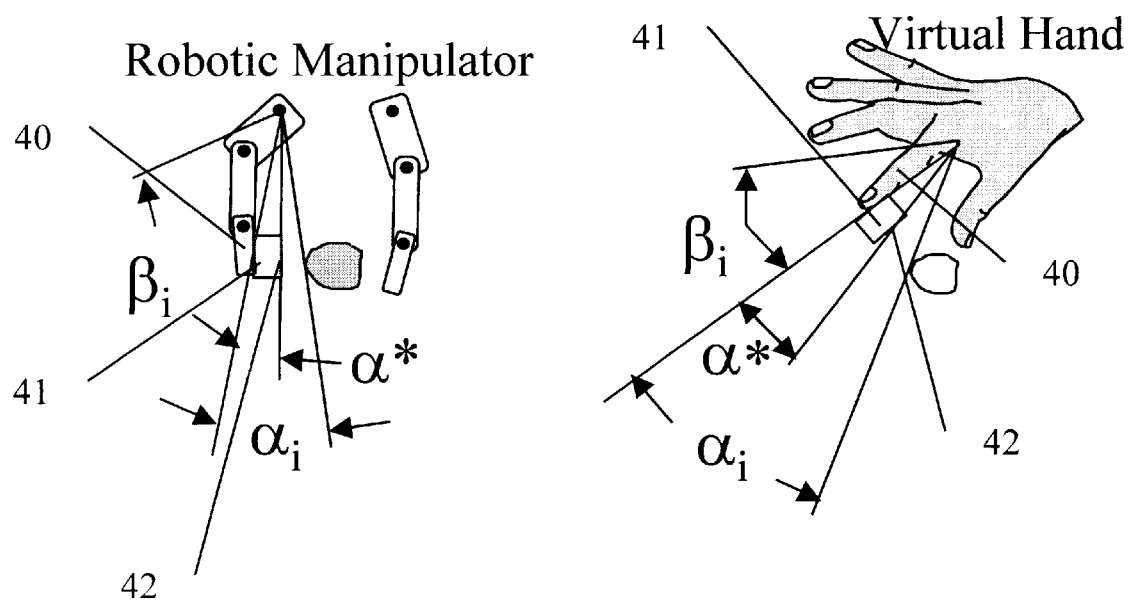
FIGURE 7

FORCE DISPLAY MASTER INTERFACE DEVICE FOR TELEOPERATION

This application is a continuation in part of application Ser. No. 09/195,318 filed on Nov. 18, 1998.

FIELD OF THE INVENTION

The present invention relates to human machine interfaces, particularly to those interfaces that measure human body positions and display forces to the human operator.

BACKGROUND OF THE INVENTION

Teleoperation refers to a mode of enhanced human control of remote manipulators. In teleoperation, the human operator utilizes a controller device or "master" in combination with his or her body to control the positions of a remote manipulator or "slave" device. The slave or remote manipulator may be a physical robotic gripper, or a virtual computer generated representation of a human body part, most commonly a human hand. In teleoperation, relative positions or forces of the human body are measured at the master and used to control the remote manipulator positions or forces at the slave. Most often positions are measured at the master and used to control the slave positions, and forces are measured at the slave to be displayed to the human operator through the master. In virtual slave environments, the forces are calculated within the virtual reality computer, while in robotic slave environments, the forces of contact between the slave and any object are measured via forces sensors. One human body part that is very well suited for teleoperation control is the human hand. The hand is most commonly used for highly dexterous manipulation tasks in interaction with our everyday surroundings. Because of this human ability several instrumented master devices have been developed in order to measure the time varying positions of the fingers on the human hand, utilizing the position data to control the finger positions of a virtual or robotic slave hand. Some of these devices have been developed to also provide a means for display of forces that occur in the slave environment to the human operator in the master environment. However the prior art is lacking in the simplicity necessary to allow large scale acceptance of this method of interaction, and/or are not capable of displaying force sensations that match those of real world interactions, especially at the high rate of speed these sensations are processed by the human operator.

The present invention relates to a master device capable of measurement of finger angular position and display of forces of contact experienced by the slave to the human operator. Both position measurement and force display are performed locally to the fingertips with respect to the hand. Many methods exist for measuring the global position and orientation of the human hand and using this data to control the position and orientation of the slave hand. Some methods include: attaching the master of the present invention to a joystick, attaching the master of the present invention to a six degree of freedom robot, or the use of a magnetic type tracking device.

The research in the area of local finger position measurement and force display dates back at least as far as 1963, when Jones and Thousand (U.S. Pat. No. 3,263,824) disclosed a device for providing the operator with a kinesthetic sensation which simulates the force being placed on a object controlled by the manipulator. This device consisted of an air bladder attached to the interior finger surfaces of an operator worn glove. The bladder is controlled to inflate at a pressure proportional to the force measured at a remote robotic manipulator. One deficiency in this device is that it is difficult to apply and remove the bladder pressure at very high frequencies necessary to approximate real time interaction. A second drawback is that the bladder material gathers and bunches up as the operator moves their finger from the extended position toward the palm to the retracted position, not permitting full finger-retraction.

Previous attempts at hand mounted single controlled degree of freedom finger tip force displays have provided forces that vary widely with finger bend angle, and/or are able to represent motion through only a fraction of the 180 degrees of real finger bend motion. For example, the palm mounted air cylinder method of Burdea's (1996) Rutger's Master I and Rutger's Master II provide a force at an angle that widely varies with finger bend angle, and can only represent finger bend from approximately 40 to 90 degrees. The cylinder mounted to the palm also provides a force to the operator's palm for all slave/object interactions, even those in which there is no contact between an object and the slave palm area. The angle of applied force also varies with finger bend angle for the tendon approach of Kramer (U.S. Pat. No. 5,184,319). The Kramer device uses tendons that pass along the outer surface of the operator's hand, thus utilizing the outer surface of the knuckles as a fulcrum point for application of forces to resist finger retraction. With this approach, the tendon force must be very high to restrict finger retraction, and consequently, it is difficult to maintain the tendons in their desired position. Additionally with the Kramer device, the forces applied to the operator's fingertips are substantially directed along the longitudinal axis of the finger distal digit, when the finger approaches the fully extended and fully retracted positions. In contrast, during real grasp operations, the force of contact between grasped objects and the human fingers are substantially normal (perpendicular) to the longitudinal axis of the finger distal digit. The tendon with additional moment arm modification of Virtual Technologies (1997), more closely provides normal direction fingertip forces throughout full finger bend range, but at the expense of applying ghost forces to the back of the second finger phalange.

Other approaches to finger force display masters employ devices that do not permit a large workspace for hand motion, attach heavy actuators to the human body, provide forces at widely varying angles with respect to the longitudinal axis of the distal finger digit, limit finger bend position to only a small portion of its full range, or are very expensive to manufacture. Additionally prior approaches fail to provide a force display signal to the operator at a high enough rate of speed to simulate real world touch sensations, thus resulting in jerky or lively object sensations, unstable oscillatory force applications, or require very slow human command motions.

OBJECTS AND SUMMARY OF THE INVENTION

It is an object of the invention to provide a means of displaying forces substantially normal to the fingertip through out the full range of finger bend, for use in robotic and virtual reality environments, without the aforementioned shortcomings. The application of forces will permit simulation of grasping tasks, touching surfaces with the fingers extended, deforming virtual object shapes and simulating the removal of material from a virtual body such as virtual sculpting.

It is an object of the present invention to provide a master device which is of simple construction and requires the minimum number of controlled degrees of freedom to accurately measure fingertip positions and provide force display thereto, and thus require the minimum number of measured control variables and the minimum number of actuators.

It is an object of the present invention to provide a device for force display that without modification can be effectively used by people with a wide range of hand sizes.

It is also an object of the invention to provide to provide a master device for teleoperation that exhibits a high degree of transparency to the operator, such that unobstructed motion of the slave, is represented to the operator as free unobstructed motion of the fingers throughout a large range of finger motion.

It is another object of the invention to provide a master device that is portable and thus provides the operator with a large workspace.

It is a further object of the invention to provide a master device that is comfortable to wear for long periods of time and thus is light weight, has low apparent (to the user) inertia, and yet maintains a high stiffness so as to provide realistic rendering of forces encountered when grasping rigid objects.

Yet another object of the invention is to provide a master device which is of simple construction such that manufacturing costs will be reasonable and that said device may enjoy wide acceptance in the marketplace.

Another object of the present invention is to provide a master device that is capable of representing initial contact with remote objects at a high rate of speed, permitting teleoperation that is stable and may be done in normal human speed, and provides user force display that closely resembles forces experienced in real human hand and object interaction.

Another object of the invention is to provide a master device that is very safe to operate and permits the operator to quickly and easily disable all force display to their body.

Still another object of the invention is to provide a master device that provides minimal "ghost" forces (or forces that in real manipulation are not present) to the operator throughout all modes of operation. These and other advantages of the present invention will appear from the following description, accompanying drawing and appended claims.

In accordance with one embodiment of the invention, a master device is provided having at least one linkage assembly mounted to the operator's body with a base connection to the back of the users hand and a distal link that connects to the user's fingertip. Between the distal connection and the base two pivotal links are provide in series such that the first link is pivotally connected to the base and the second link is pivotally connected to both the first link and the distal link. The links are configured such that rotation of the first link with respect to the base provides motion of the distal that may follow the normal motion of finger bend during grasp tasks. The two links are further configured such that throughout the full bend range of motion for the finger, the second link remains approximately perpendicular to the distal link and thus the fingertip pad.

A sheathed cable transmits the rotational motion of the first link, with respect to the base, wherein tension applied to the cable results in relative motion between the cable and the sheath. In the present invention a proximal end of the sheath is mounted to the base such that longitudinal motion of the sheath with respect to the base is prohibited. The proximal end of the cable is mounted to the first link such that longitudinal motion of the cable with respect to the first link is prohibited. As such rotation of the first link with respect to the base (and thus the finger bend) is reflected by longitudinal motion of the cable with respect to the sheath. This is advantageous as the motion permits mounting of the position measurement and force providing assembly in a location remote from the users hand. Thus the operator need not carry the weight and bulk of the aforementioned assemblies.

It will be appreciated that while each finger has three degrees of freedom along the longitudinal plane, the degrees of freedom are usually not controlled independently by human beings in grasping tasks. The finger linkage is designed so that while three total degrees of freedom were present, finger bend toward and away from the palm could be represented by a single degree of freedom. This one degree of freedom is to be used for angular position measurement of the finger, and for force display, resisting finger bend toward the palm. By representing finger motion and restriction thereof with one degree of freedom in the above described the finger bend linkage, both the mechanical structure and the computation requirements of force display control are greatly simplified, and thus approach fulfillment of the objectives of high-speed response, and low system cost. Additionally because there are two uncontrolled degrees of freedom, the linkage is effective for a variety of operator's hand sizes, without the need for adjusting link lengths. Because the finger linkage only contacts the human body at the fingertip and main body of hand, display of forces can only be felt at these locations. This is advantageous because the back of hand surface (opposite the palm) is one area of the body least sensitive to force application, and the fingertip is the desired force display target. Thus, "ghost" forces, or forces applied to the operator that would not normally exist in direct real manipulation are kept to a minimum. Many prior approaches to force display have provided ghost forces in a variety of locations, often at relatively high magnitudes. Another benefit of the linkage design is that throughout 180 degrees of motion for the finger, resistance forces are applied substantially perpendicular to the distal finger pad, accurately representing the direction of normal forces that occur during real grasping and manipulation of objects.

To fulfill the objective of low resistance to motion while bending fingers in the absence of virtual object collision, a remote "replicated finger" pivotal bar is attached to the distal end (or remotely mounted end) of the cable. The replicated finger duplicates the motion of the operator's finger, as a single degree of freedom pivotal bar, scaled by a factor of two (approximately). Thus, as the operator's finger moves from the 0 to 180 degree bend positions, the replicated finger moves from a 0 to 90 degree position. Since the replicated finger provides a scaled replicate of the real finger motion, the position of the replicate finger is used to represent the position of the slave finger. Additionally, resistance to motion of the replicated finger results in resistance to motion of the operator's finger. Taking advantage of this, a de-coupled contact drum is pivotally mounted in the plane of the replicated finger, such that the drum may be positioned to contact the replicated finger at any degree of rotation. This configuration allows a computational advantage for grasp tasks because when grasping an object, people must first move their hand near the object with the fingers forming a pre-grasp shape larger than the object to be grasped, and then bend their fingers toward the palm to grasp the object. Thus, it is possible to move the contact drum to a position such that it will interfere with finger bend while in the pre-grasp formation, before the finger has begun to bend inward to grasp a virtual object, resulting in better system response time for grasp tasks. The contact drum is positioned by a DC gear motor, under position control. This arrangement results in a first condition of contact or non-contact of the contact drum with the replicated finger, and a second condition of variable force between the contact drum and the replicated finger, which is controlled via pulse width modulation (PWM) by a master control computer. An advantage of the de-coupled actuator arrangement compared to directly coupled actuators (employed by prior master interfaces) is that direct-coupled actuators provide a force only after virtual finger/virtual object interference, which may appear "jerky" if very high control speed is not maintained. Another advantage is that the actuator need not be driven in contact with the user or be freely back driven, during free motion in order to appear transparent to the user, and thus permits higher transparency with a lower cost motor. Additionally, the de-coupled actuator provides advantages of increased stability during grasp tasks (since the contact drum is essentially stationary), and the ability to present high stiffness virtual objects.

BRIEF DESCRIPTION OF THE DRAWINGS

FIG. 6 depicts a conceptual variation of the control scheme for more rapid computation.

FIG. 7 further depicts a conceptual variation of the control scheme for more rapid computation.

DETAILED DESCRIPTION OF THE PREFERRED EMBODIMENTS OF THE INVENTION

Figure 1:
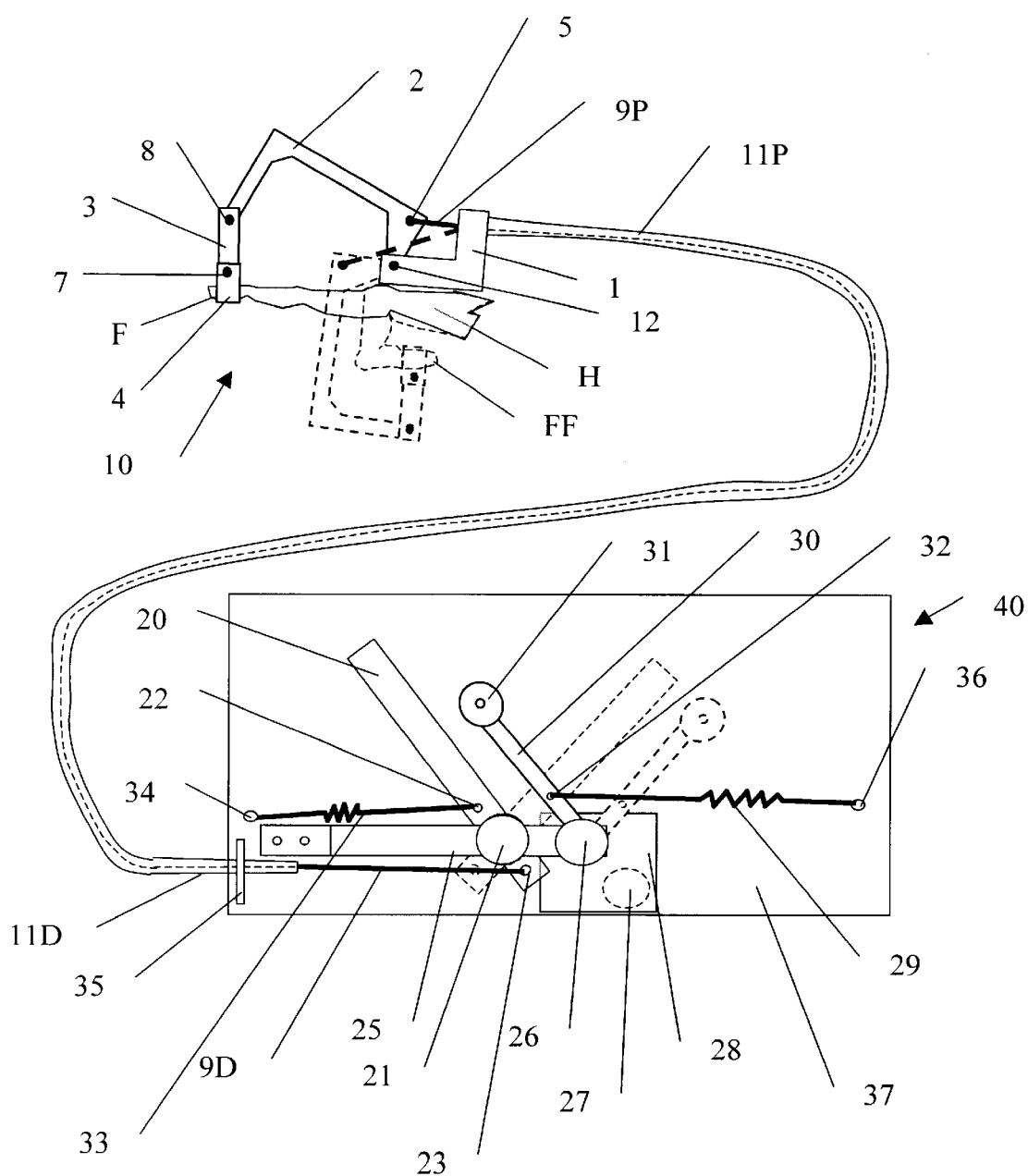
FIG. 1 is a side view of the hand mechanism connected to a top view of the remote finger position measurement and force display assembly, showing a non-contact condition.
Figure 5:
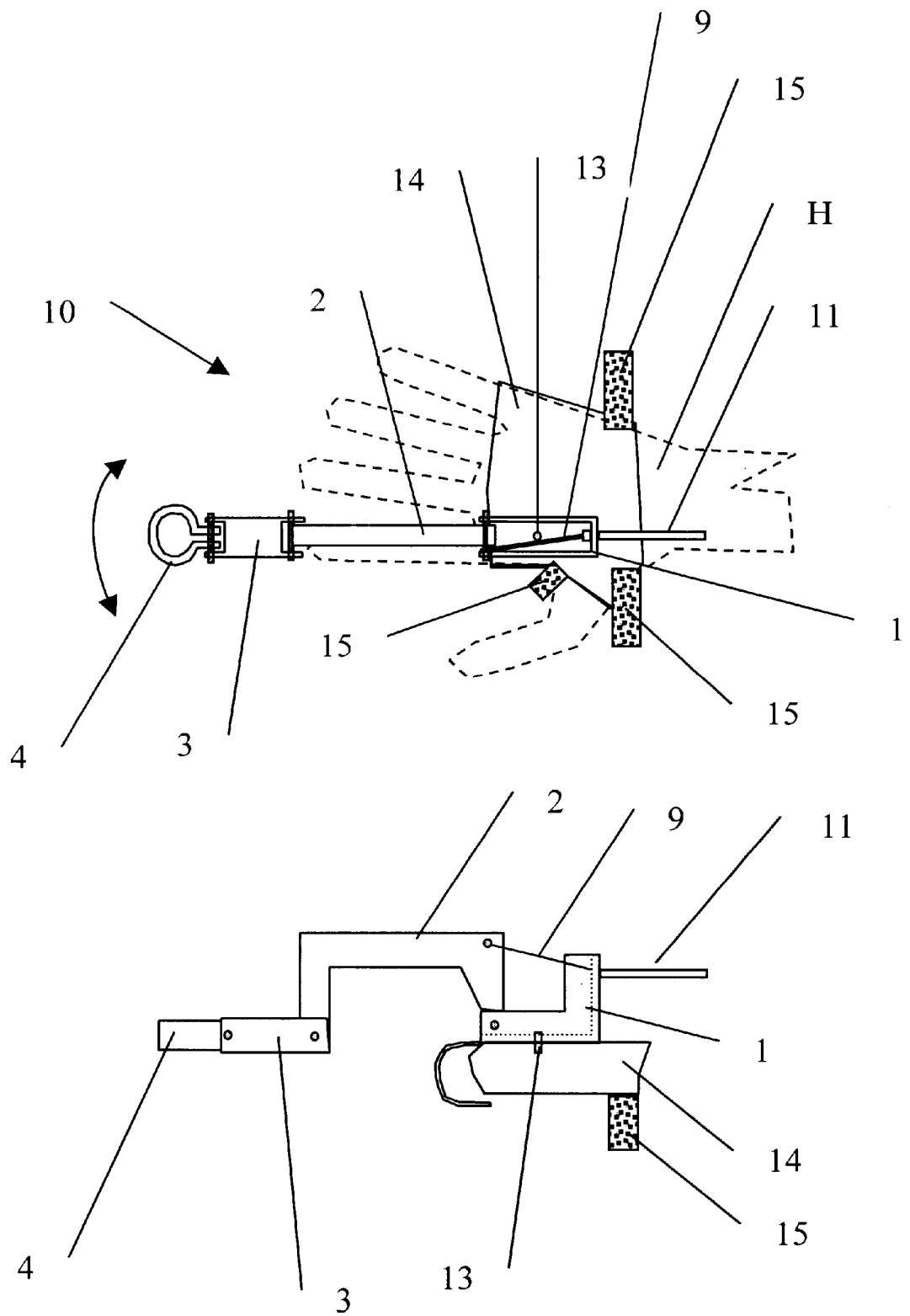
FIG. 5 illustrates top and side views of the finger mechanism and hand attachment device.

The upper portion of FIG. 1 shows a side view of the finger mechanism 10 in a first position (solid lines) and a second position (dashed lines). The first position indicates a fully extended finger, and is referred to as a 0 degree position, while the second position shown is that in which the finger is fully retracted toward the palm and is referred to as a 180 degree position. Finger retraction is finger motion in the counter-clockwise direction, while finger extension is finger motion in a clockwise direction in FIG. 1. In the lower half of FIG. 1, the remote assembly 40 for remote measurement of finger angular position and selective display of contact and variable force is shown. Referring to the finger mechanism 10 shown in the upper portion of FIG. 1, a base 1 is pivotally connected to hand platform 14 by screw 13. The hand platform 14 is attached to the back of the operator's hand H during use by hook and loop fasteners 15, as best seen in FIG. 5. Link 2 is pivotally connected to the base 1 at pin 12. Link 3 is pivotally connected to link 2 by pin 8. Link 4 is pivotally connected to link 3 by pin 7. Link 4 is also fitted to attach to the operator's fingertip F. The proximal end 9P cable 9 is attached to link 2 at screw 5. Cable 9 travels through sheath 11, for which proximal end of sheath 11P is rigidly attached to base 1.

Figure 2:
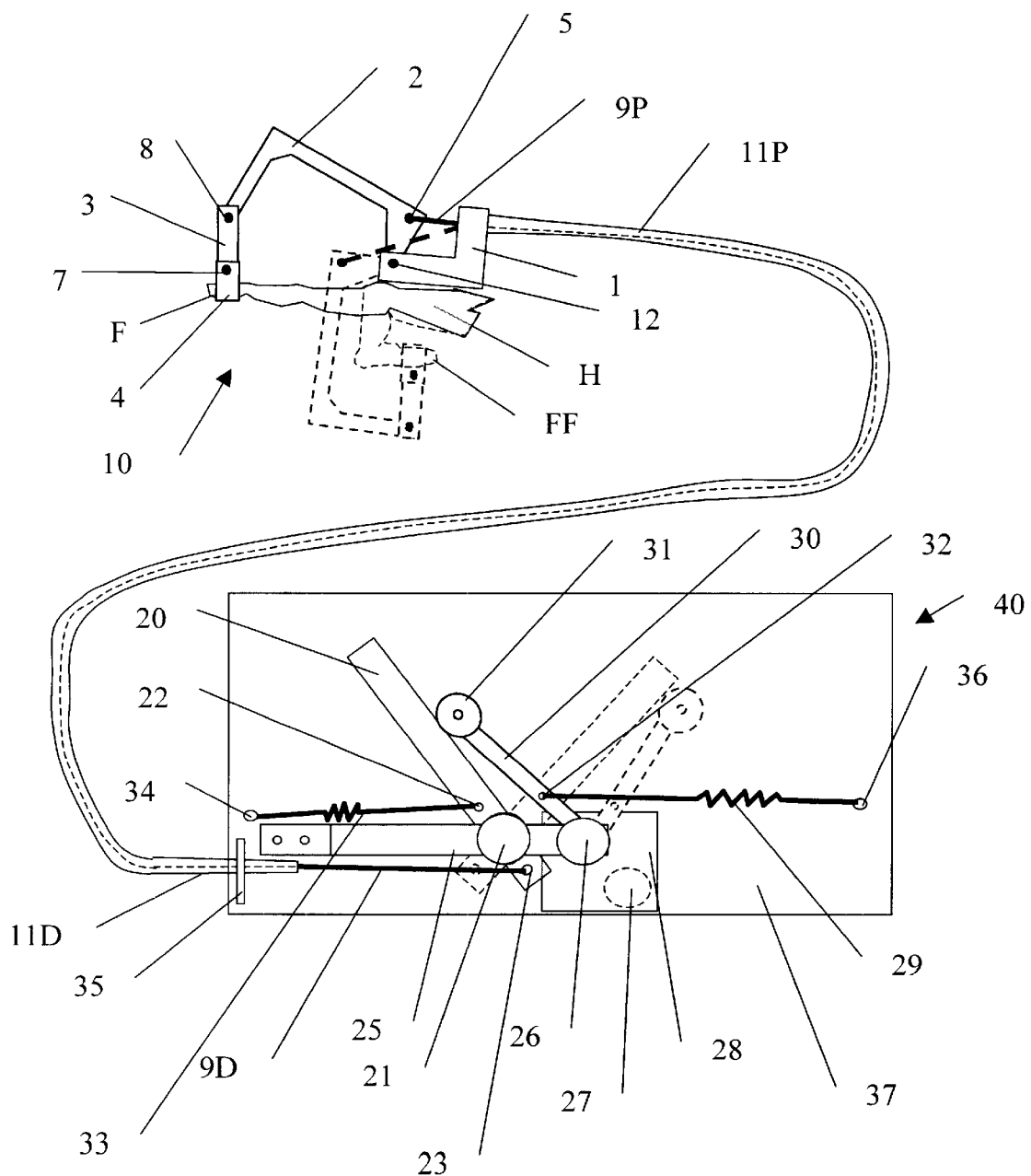
FIG. 2 is a side view of the hand mechanism connected to a top view of the remote finger position measurement and force display assembly, showing a contact condition.
Figure 3:
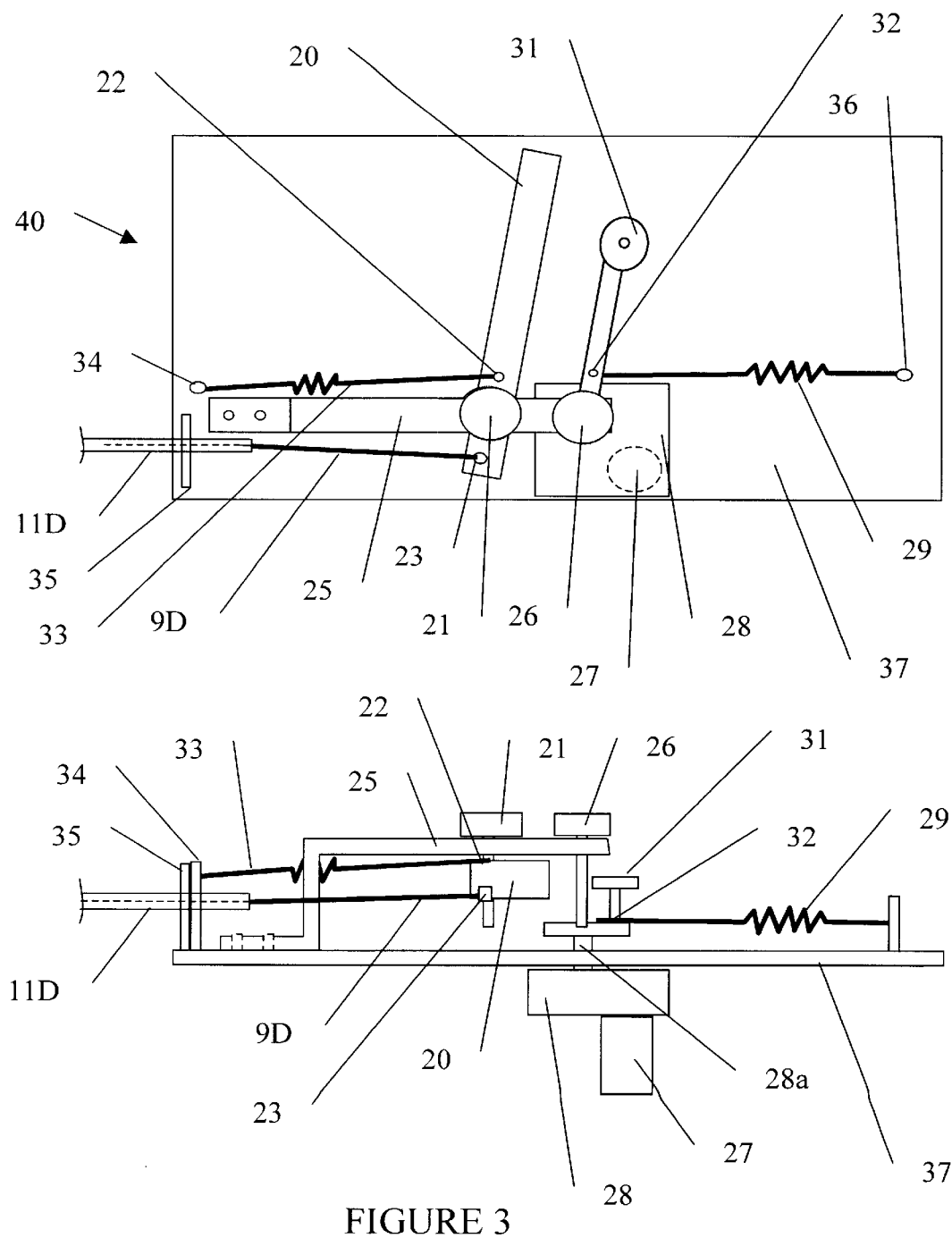
FIG. 3 is a top view and a front view of the remote finger position measurement and force display assembly, showing a non-contact condition.

To achieve the objectives of a high degree of transparency, lightweight, and operator comfort, a remote control assembly 40 is employed. The remote control assembly permits the placement of position measurement and force generation components in a location such that the weight and bulk of these components need not be carried on the operator's body, yet permit a large workspace. At the distal end of the cable 9D, the cable 9 is attached to replicated finger 20 at screw 23, as shown in FIGS. 1, 2, and 3. The distal end 11D of sheath 11 is firmly attached to remote base 37 by sheath anchor 35. Replicated finger 20 is pivotally mounted to potentiometer 21, for revolute motion therewith. Potentiometer 21 is rigidly attached to bracket 25, which is rigidly mounted to base 37. Also attached to replicated finger 20 is extension spring 33, by screw 22. The opposite end of extension spring 33 is attached to the base 37 at screw 34. The extension spring 33 provides a means to return the replicated finger 20 toward the 0 degree position during finger extension, prohibiting slack to form in the cable 9. As the human fingertip F is retracted toward the palm to the position FF shown in dashed lines, the replicated finger 20 is rotated about the potentiometer 21 axis to the replicated finger position shown in dashed lines in the lower portion of FIG. 1. Thus as the finger travels through 180 degrees of motion, the replicated finger travels through approximately 90 degrees of motion. The solid line position of the replicated finger 20 is referred to as the 0 degree position, while the broken line position of the replicated finger is referred to as the 180 degree position, to correspond with the finger tip position represented. When connected to a DC voltage source, the potentiometer 21 produces a voltage signal proportional to the angular position of the replicated finger. The application of a potentiometer to produce a voltage signal proportional to the angular position is well known in the art. The voltage signal of the potentiometer is thus used to represent the angular position of the operator's finger. It will be appreciated that alternative sensing elements (such as encoders, etc.) other than the potentiometer described above can be employed to perform the remote replicated finger position measurement without departing from the scope of the present invention.

Contact drum 31 is pivotally connected to bar 30, which is in turn rigidly connected to the output shaft 28a of gear set 28. Gear set 28 is driven by motor 27, most clearly seen in FIG. 3. Also rigidly connected to gear set output shaft 28a is the shaft of potentiometer 26, which is applied in a manner similar to potentiometer 21, to yield a voltage signal proportional to the gear set output shaft angular position. The base of potentiometer 26 is rigidly mounted to bracket 25 as shown in FIG. 3. Extension spring 29 is connected to bar 30 at screw 32. The opposite end of extension spring 29 is connected to base 37 at screw 36. The extension spring 29 biases the bar 30 and contact drum 31 to rotate (clockwise in FIG. 1) to the position shown in dashed lines, in the absence of a voltage application to the motor 27. Thus when no voltage signal is applied to the motor 27, the contact drum 31 assumes a position such that it will not interfere with the motion of replicated finger 20 during free retraction and extension of the fingertip F. It will be appreciated by those skilled in the art that although a motor and gear set is used as an actuator to generate forces in the preferred embodiment, other actuators such as a linear motor, a drive screw system, a pneumatic or fluid motor or cylinder, etc. could be used without departing from the spirit of the present invention.

The contact drum 31 position is controlled by application and removal of a voltage to the motor 27. The position is closed loop controlled to assume a desired position $\gamma$ by application of a motor drive voltage in response to a voltage signal provided by potentiometer 26 that represents a position less than $\gamma$, and removing the motor drive voltage in response to a voltage signal provided by potentiometer 26 that is greater than the desired position $\gamma$. The contact drum 31 position is thus controlled in this manner, through the master control PC as indicated in the left side of FIG. 4. In the case that the slave finger is not within a predetermined distance to contact any object in the slave environment, the human finger will not experience any force signal, and thus the contact drum 31 position $\gamma$ is controlled to assume a value $\gamma=\beta+\alpha$, wherein $\alpha$ is assigned a predetermined maximum value, for the condition of no object sensed in the slave environment. Thus the position of the contact drum 31 is controlled to trace the position of the replicated finger 20 during free motion of the human fingertip F, offset by a small distance as shown in FIG. 1. In response to the replicated finger 20 position $\beta$, the control system depicted in FIG. 4, causes the slave finger, to assume a position $\beta$.

When the slave finger is in contact with an object, it is desirable to present the operator with a signal representing of the force of contact. Now referring to FIG. 2, in the case of virtual slave finger and virtual object contact, or robotic slave finger and real object contact, the contact drum 31 position is controlled to remain in contact with the replicated finger 20, and thus $\alpha$ is zero and $\gamma=\beta$. This contact can be achieved over the full 180 degrees of finger motion. Further by cyclically pulsing the voltage supply to the motor 27 between an "on" and "off" state, the torque of the motor is controlled. Consequently, the torque output of the gear set 28, and force between the contact drum 31 and replicated finger 20 are also controlled. The contact drum 31 force acting on the replicated finger 20, results in a torque on the replicated finger 20, which is offset by a force applied by the cable 9 to the replicated finger 20. The tensile force in the cable 9 is transmitted to link 2 of the hand mechanism 10 through screw 5. The force of the cable 9 applied to link 2 results in a torque on link 3 that is counter balanced by the force of link 3, applied to link 2 through pin 8. The force of link 3 is subsequently balanced by the force applied by the user at the fingertip F. Thus the magnitude of the force applied to the fingertip F of the operator by link 4 is controlled by sequential"on" and "off" signals to the motor, the ratio of "on" signals to "off" signals, being proportional to the force applied to the finger tip. While the above mode of open loop force control while the slave finger is in contact with an object in the slave environment is disclosed as the preferred embodiment, other methods of force control, such as open loop current control, closed loop force control, etc. may be used within the scope of the present invention.

One important observation in viewing the hand mechanism 10, is that while the fingertip F travels between the 180 degree and 0 degree positions in either direction, the link 3 remains substantially perpendicular to the fingertip F. Thus the force signal experienced by the operator is in a direction substantially perpendicular to the fingertip F. This is desirable because a perpendicular force to the fingertip, represents the primary direction of forces of contact during a wide range of human hand interaction with real objects.

Figure 4:
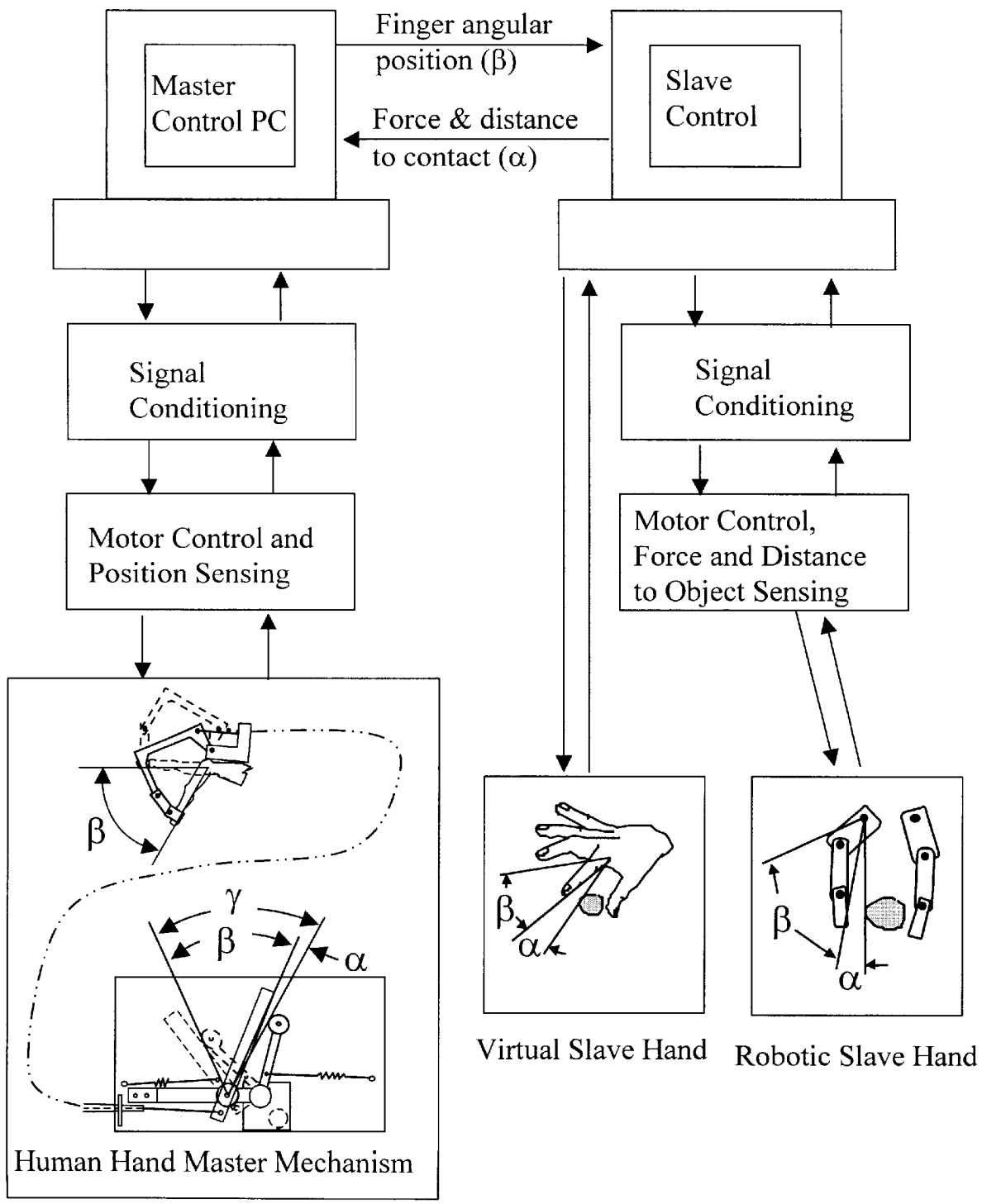
FIG. 4 is a schematic illustration of the flow of electrical and mechanical control signals.

FIG. 4 shows the information flow through the entire teleoperation system. In the lower left hand corner of FIG. 4, there is a block indicating the human hand in combination with the mechanical components of the present invention. In this block, at any time, the present angular position of the finger, and the angular position of the replicated finger 20, as described above are depicted as $\beta$, while the present angular position of the contact drum is indicated as $\gamma$. During free motion of the finger, when the slave is not contacting any object, the contact drum 30 is controlled by position to trace the replicated finger 20 position, off set by an angle $\alpha$, as described earlier. The position data ($\gamma$) of the contact drum 30 is measured as a voltage by potentiometer 26 as described above, and the voltage signal is represented in the diagram in the motor control and position sensing block. This block indicates electrical signals associated with the electromechanical devices shown in the lower left block. The voltage of the potentiometer 26 conditioned in the signal conditioning block above, which converts the analog voltage signal into a digital signal suitable for computer processing. In the preferred embodiment, the signal conditioning block consists of a multi-function data acquisition board, capable of converting voltage signals to digital computer readable data, and computer "on" and "off" data into a relay switching signal. The master control PC block indicates a common personal computer, through which control calculations are performed, permitting high speed execution of the control function described herein. The master control PC communicates with a second computer, associated with the slave finger. For virtual reality applications, the slave control computer also executes algorithms associated with display of a three dimensional virtual slave hand, and controls the motion (orientation and position) of the virtual slave hand. It is well known in the art to have a virtual hand displayed in combination with a virtual reality system, and it is well known in the art to control the position and orientation of the virtual hand by use of a magnetic tracking device attached to the operator's hand. For application of the present invention with a robotic slave hand, the slave control computer executes necessary calculations to enable the robotic fingers to follow the position sent by the master control PC. The slave control computer may in some applications execute calculations to enable the position and orientation of the slave hand to follow that of the operator's real hand, or the robotic hand position and orientation may be controlled by other methods known in the art. For either application domain, the master control PC sends finger angular position data ($\beta$), and the slave control computer in turn commands the slave fingers to assume the given position ($\beta$). The slave control computer sends the force to be displayed and the distance between the slave finger and any object of impending contact ($\alpha$) to the master control computer. For virtual reality applications, the force to be displayed is calculated within the slave control computer. The master control PC executes an algorithm to appropriately control the contact drum 31 position ($\gamma$) or the motor 27 torque thereby controlling the fingertip force displayed by link 4.

One important aspect of the present invention is the ability to present operators of teleoperation systems a sensation of initial contact with objects at a high rate of speed. To achieve this goal, in addition to applying the de-coupled actuator system as described thus far, a novel contact algorithm is employed. The contact algorithm is called DECAFF as an acronym for De-Coupled Actuator with Feed Forward control and is described as follows. Information regarding the distance between the slave finger and any objects within the path of the finger during further retraction is used to control contact drum 31 position (γ) prior to slave finger contact with an object in the slave environment. In figure 4, the angular position between slave finger and an object of impending contact is indicated as α. For virtual reality applications, the angle α between the virtual slave finger and any objects in the path of motion is determined by appropriate intersection checking between a set of lines, or preferably a cylinder geometric entities attached to the virtual slave finger, but not graphically displayed. Intersection with cylinders of various radii and other objects, will determine, based on the radii of cylinders of intersection, the distance of further finger retraction required before the virtual slave finger intersects with the virtual object. The distance is represented as the angle α within the virtual reality slave control computer and transferred to the master control PC shown in FIG. 4. Many methods of intersection determination are well known in the art of virtual reality programming, and it is not considered a part of the present invention to develop such a methodology. For robotic applications, the robotic finger is equipped with a distance sensor, which will measure distance to objects of impending contact, should the robotic finger further retract, and after proper signal conditioning, as indicated in FIG. 4, send this information to the master control PC as angular distance α. In response to the distance before contact value of α, the master control PC will command the contact drum to assume a position of γ, such that γ=β+α. Wherein β is the current position of the replicated finger 20, which is also the current position of the human fingertip F, and the current position of the slave finger, all measured with respect to the 0 degree position. Thus if the operator should retract the fingertip F toward the palm, the contact drum 31 will interfere with the replicated finger 20, and prevent further motion thereof. Because the contact drum 31 position is controlled to be in the proper position before the slave finger contacts the object of interest, the operator will immediately experience the force of contact. Thus, unlike prior teleoperation systems, the contact sensation is displayed with out any delay due to the time response of motor actuation, and information flow through the computer control systems. It is well known in the art that delay in display of initial contact is very problematic for force reflection teleoperation systems such as the present invention. Such delays may result in a human operator of lively objects, unstable forces, or very high robotic slave finger forces. In order to reduce the robotic slave forces, prior teleoperation systems typically artificially reduce the maximum travel velocity of the slave fingers, thus only permit very slow interactions. After initial contact between the slave finger and an object in the slave environment is made, the forces measured by the slave will settle from a rapidly changing magnitude to a near steady state magnitude. As the forces approach the steady state magnitude, the system begins open loop pulse force control as described above.

Although the invention described herein has been described as a force display for a single finger, it is within the scope and intention of the present invention to implement force display for multiple fingers. Each finger being implemented as a duplicate of the mechanical and electrical components described in the above specification.

For some applications such as implementation in a three-dimensional virtual reality modeling computer, the computation requirements for determination of pre-contact distance in an analog fashion as described thus far may be too taxing. Should this computation load be too great, it can be greatly reduced by implementing a slight variation of the control algorithm designated as DECAFF-B (Binary feed forward). In the DECAFF-B embodiment of the invention, continuous analog feed-forward pre-contact distance data is replaced by a pre-contact condition that is represented in a binary format. This format of pre-contact condition uses information readily available from a bounding box collision detection routine commonly implemented in virtual reality codes. The bounding box for this implementation is attached to the outer surface of the virtual finger adjacent to the distal pad of the fingertip as shown in FIG. 6. The finger 40 shown in this figure represents a virtual slave finger. 41 in the figure represents a bounding box for the slave finger 40. The distance from the virtual slave finger 40 to the outer surface 42 of the bounding box 41 is defined as a constant α* (eg. α*=10 degrees) as shown in FIG. 7.

The virtual reality computer then need only send to the haptic controller as pre-contact close proximity information a code (e.g. α=0 for no close proximity object and α=1 for the presence of a close proximity object) indicating whether there is an object inside the bounding box or not. If there is no object inside the bounding box, the contact drum of the haptic interface is controlled to offset track the position of the replicated finger by a maximum value of $\alpha_{max}$ (eg. $\alpha_{max}$=50 degrees), and a pre-contact condition of 0 is assigned to α. In this case the contact drum is commanded to maintain a position of:

$$\gamma=\beta+\alpha_{max} \quad [1]$$

If the virtual finger approaches an object in the virtual space, such that the object interferes with the bounding box, the haptic control PC defines a fixed contact drum position:

$$\gamma^*=\beta+\alpha^* \quad [2]$$

The contact drum position γ* is defined when the bounding box makes contact with an object and the pre-contact condition changes from α=0 to α=1. The contact drum remains at γ* as long as the object remains in the box and the force is at the 0% or 100% magnitude level (i.e. α=1). Should the object be removed from the box due to virtual finger motion away from the object, or object motion away from the virtual finger, the pre-contact condition changes from α=1 to α=0 and the contact drum returns to position control of EQ. [1]. Should the virtual finger position change so as to contact an object in the virtual space, the control of the haptic PC switches to force control mode and provides a variable magnitude force to the operator as commanded by the virtual reality computer (e.g. F=Kx+Bx'). In this case as with the DECAFF-A (Analog feed forward) control algorithm described in the prior fingertip embodiment, the force control can be implemented by a PWM algorithm. Similarly the conditions of switching to force control are repeated as:

Force Control if 0%<F<100%      [3]

Position Control if F=100% OR F=0%      [4]

By EQ. [4] position control is maintained for contact with surfaces of high stiffness such that the force (F) makes a step response from 0% to 100% at the first sampling cycle that indicates contact. This implementation takes full advantage of the benefits afforded by the DECAFF-A method for haptic display of rigid surfaces with the exception of a somewhat lower positional accuracy. While the positional accuracy of DECAFF-B is lower than that of DECAFF-A, the accuracy still exceeds that offered by traditional control methods employed in haptic display for a given surface model and system bandwidth. The reduced accuracy of the DECAFF-B as compared with the DECAFF-A is a result of discrete time sampling of the pre-contact condition of intersection between a slave object and the bounding box. For a finger velocity of $\beta'$, the maximum contact drum positional error is achieved when a bounding box and slave object intersection occurs immediately following a slave intersection sample. Then the maximum contact drum error ($\delta$) is given by the product of the finger velocity and the sample period (T):

$$\delta = \beta'* T \quad [5]$$

since $$\beta' = d\beta/dt \quad [6]$$

and $$\delta = d\beta \quad [7]$$

and $$T = dt \quad [8]$$

It should be noted that while the above described sampling position error exists, delay errors that would result (in traditional design haptic interfaces) due to actuator response and force calculations are eliminated. If desired, the magnitude of the maximum positional error can be reduced by accounting for the error in the determination of contact drum position. The reduced error formulation is given by a modification of EQ. [2] as:

$$\gamma^* = \beta + \alpha^* - (\beta'*T)/2 \quad [9]$$

Where the maximum positional error magnitude of the contact drum controlled by EQ. [9] is one half that possible with contact drum control by EQ. [2].

A similar simplified algorithm can be effective for reduced sensor requirements in the tele-operation application domain as shown in FIG. 7. Here the distance sensor implemented need only measure whether or not an object is within a preset distance from the robotic finger 40 (indicated by the bounding box 41 and outer surface 42 in FIG. 7). If there is an object present within the prescribed proximity distance, the haptic interface contact drum is controlled to maintain a position defined by $\gamma^*$. Similar to the VR implementation, $\gamma^*$ is defined by the sum of the position of the replicated finger ($\beta$) at the time the robotic sensor changed from a non-contact to a contact condition and a preset sensor range distance (e.g. $\alpha^* = 10$ degrees). If the robotic sensor senses no object, the contact drum traces the replicated finger motion, offset by $\alpha_{max}$ (eg. $\alpha_{max} = 50$ degrees). If the robotic finger is in contact with an object, the haptic interface is commanded to provide a variable force signal to the operator, proportional to the force measured by the robotic finger force sensor. Using this system as the operator (when moving at a high rate of speed) initiates a grasp motion, experiences a restriction to continued finger retraction until such a time when the robotic finger would actually be in contact with the grasped object. Thus, (subject to robot bandwidth limitations) human finger position can be used to directly control the robotic finger position, and robotic force sensor data can be directly used to control the reflected force magnitude. This can be done as described above using the DECAFF technology developed herein, and permit real time simplified tele-robotic control, without system imposed velocity constraints, and without extreme forces of contact at the robotic finger (due to system time lags in robotic finger tracking of the human finger). Sensors used for this simplified implementation need not present pre-contact distance to the haptic controller PC, but rather need only provide an on/off binary signal indicating whether or not the robotic finger is in close proximity to an object in the slave environment. Because of the need only to communicate a binary condition, an appropriate sensor could be realized physically by a system of inexpensive whisker switches or proximity sensors.

Although the DECAFF design and control method presented thus far apply to a unilateral single DOF per finger grasping system, the significant improvements in human haptic performance demonstrated here are directly applicable to general haptic interface design and control in another embodiment of the invention (e.g. joystick type haptic interfaces). Having a general prismatic joint design that applies the DECAFF technology in a bilateral manner provides another embodiment utilizing the DECAFF methods. For VR applications, three dimensional pre-contact information can be provided by a bounding cube or sphere using the either the DECAFF-A or the DECAFF-B control described above, while for robotic applications multiple distance sensors could be employed.

Figure 8:
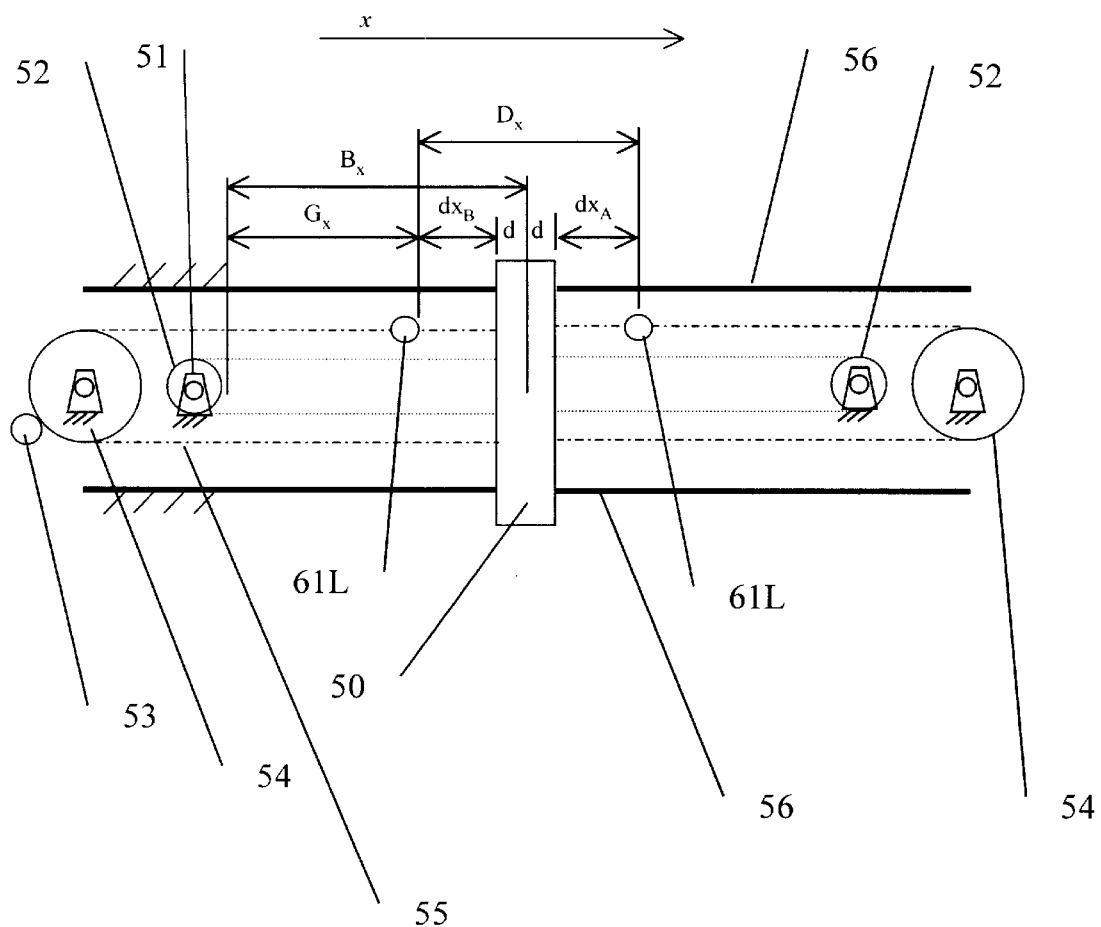
FIG. 8 illustrates a prismatic joint embodiment of the invention.

A prismatic joint implementation can be achieved (for example in a Cartesian coordinate system device) as shown in FIG. 8. In this figure, a replicated pointer 50 (analogous to the replicated finger 20) traces the motion of the operator's hand. The replicated pointer 50 slidably engages fixed rods 56. The position (along the x direction) is measured by the position measurement potentiometer 51, via a cable (shown in dotted lines) fixed to the replicated pointer and routed between two pulleys 52. The motor 53 drive uses a similar pulley 54 arrangement with a second cable 55 (shown in phantom lines) that freely passes through holes (not shown) in the replicated pointer 50. Fixed to the motor drive cable are left and right contact stops 61L and 61R (analogous to the contact drum) that may selectively assume a position of contact or non-contact with the replicated pointer 50. From the figure it should be apparent that contact stops can be controlled by a pre-contact position control switching to force control algorithm, just as has been described for the grasping device implementation of the present device. For bi-directional control, two stops are shown, thus permitting a controlled choice for which stop to use (left 61L or right 61R), depending upon the direction of the velocity (dx/dt) of the pointer 50. The right contact stop 61R is used when motion is toward the right and dx/dt is greater than zero. The left contact stop 61L is used when motion is toward the left and dx/dt is less than zero. Then the position of the motor drive is controlled by $G_x$ such that:

$$G_x = B_x - dx_B - d \text{ for } B_x' < 0 \quad [10]$$

and $$G_x = B_x + dx_A + d - D_x \text{ for } B_x' > 0 \quad [11]$$

Where $G_x$ is analogous to $\gamma_i$, $B_x$ is analogous to $\beta_i$, $dx_B$ is analogous to $\alpha_i$, while d and $D_x$ are geometric constants as depicted in FIG. 8. Because $dx_B$ and $dx_A$ are analogous to $\alpha_i$ they are controlled in a similar manner to assume either a maximum value for offset tracking when no object is within the bounding entity or a bounding magnitude when remote objects enter the bounding volume for DECAFF-B (binary) control. Similar results are achieved when motion is toward the right. Alternatively for DECAFF-A (analog) implementation, $dx_B$ and $dx_A$ contain instantaneous pre-contact distances each in the appropriate direction, depending on velocity direction of the pointer. This type of implementation shown for the x-axis could obviously be repeated for the y and z axes in 3-D space, and simply represents another embodiment of the fundamental technology developed and demonstrated in this invention. In yet another embodiment, for a three prismatic joint system (PPP), the pre-contact conditions ($dx_A$, $dy_A$, $dz_A$) or ($dx_B$, $dy_B$, $dz_B$) could be represented by a bounding cube of dimensions (2dx, 2dy, 2dz) or by a bounding sphere of radius $r=[dx^2+dy^2+dz^2]^{0.5}$.

Figure 9:
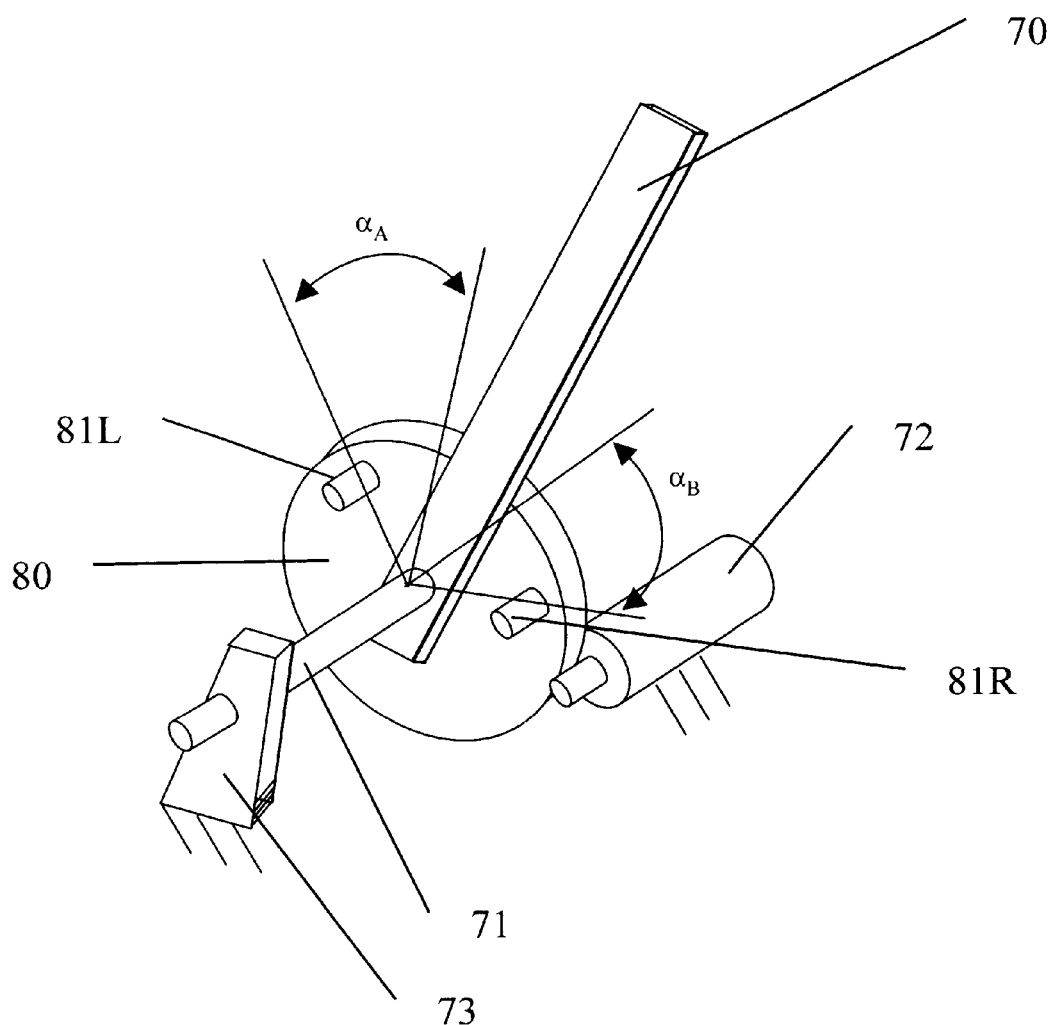
FIG. 9 illustrates a revolute joint embodiment of the invention.

Similar to the prismatic joint, a concept design for a bilateral revolute joint for use in haptic interfaces that utilize the DECAFF technology of the present invention is given in FIG. 9. In this figure the active link 70 is given a resistance to motion by the contact disc 80, via interference between the link and one of the contact drums 81L and 81R. Contact drum 81L is used for resistance to counter-clockwise motion, while contact drum 81R is used to provide resistance to clockwise motion. The active link 70 is fixed to the shaft 71, while the contact disc 80 is constructed to freely rotate about the shaft, resulting in selective contact between the motor 72 driven contact disc and the active link.

Figure 10:
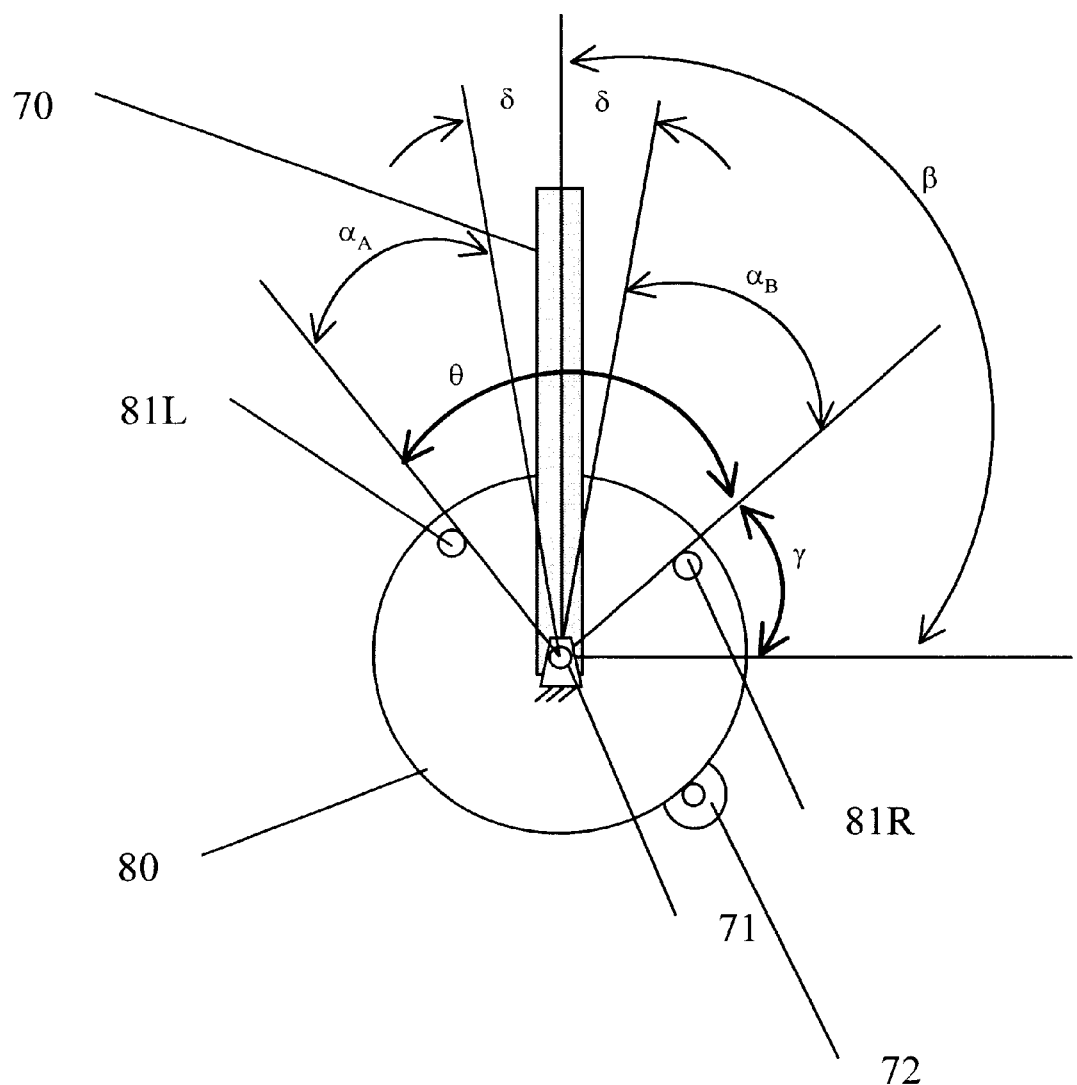
FIG. 10 shows a frontal view of a revolute joint embodiment of the invention.

The angular position of the active link 70 is measured by shaft rotation by a position potentiometer not shown, while the contact disc 80 position is measured independently by a second potentiometer also not shown, (because it freely rotates about the shaft). Both the motor 72 and the shaft bearing 73 are fixed to the ground (FIGS. 9–10) or an adjacent proximal link best shown in FIG. 11. Control variables $\alpha_A$ and $\alpha_B$ are used to indicate pre-contact conditions for CCW and CW rotation, respectively. As can best be seen in FIG. 10, the control of the bilateral contact disc is accomplished in a manner similar to that of the unilateral rotation of the implemented replicated finger discussed in the prior embodiment. In the general revolute joint, the link angular position is defined as $\beta$. The geometric constant angular distance between the two contact drums A and B is defined as $\theta$, and the angular (constant) difference between the active link defining position and the line of contact between the contact drums is denoted as $\delta$. Similar to the contact drum of the finger mechanism described in a prior embodiment, the contact disc is position controlled by angular position $\gamma$ such that:

$$\gamma=\beta+\delta+\alpha_A-\theta \text{ For } \beta'>0 \quad [12]$$

Or $$\gamma=\beta-\delta-\alpha_B \text{ For } \beta'<0 \quad [13]$$

Where EQ. [12] is used for counter clockwise motion and $\beta'>0$ and EQ. [13] is used for clockwise motion when $\beta'<0$. When operating under analog DECAFF-A control the pre-contact angle $\alpha_A$ and $\alpha_B$ are calculated by either solution of the inverse kinematics of the haptic interface (given x+dx, y+dy, z+dz; find $\alpha$), or by evaluation of the expressions for (x+dx, y+dy, z+dz). Where (x, y, z) are the coordinates of the slave and (dx, dy, dz) represent the slave pre-contact distances along the x, y, and z directions.

Figure 11:
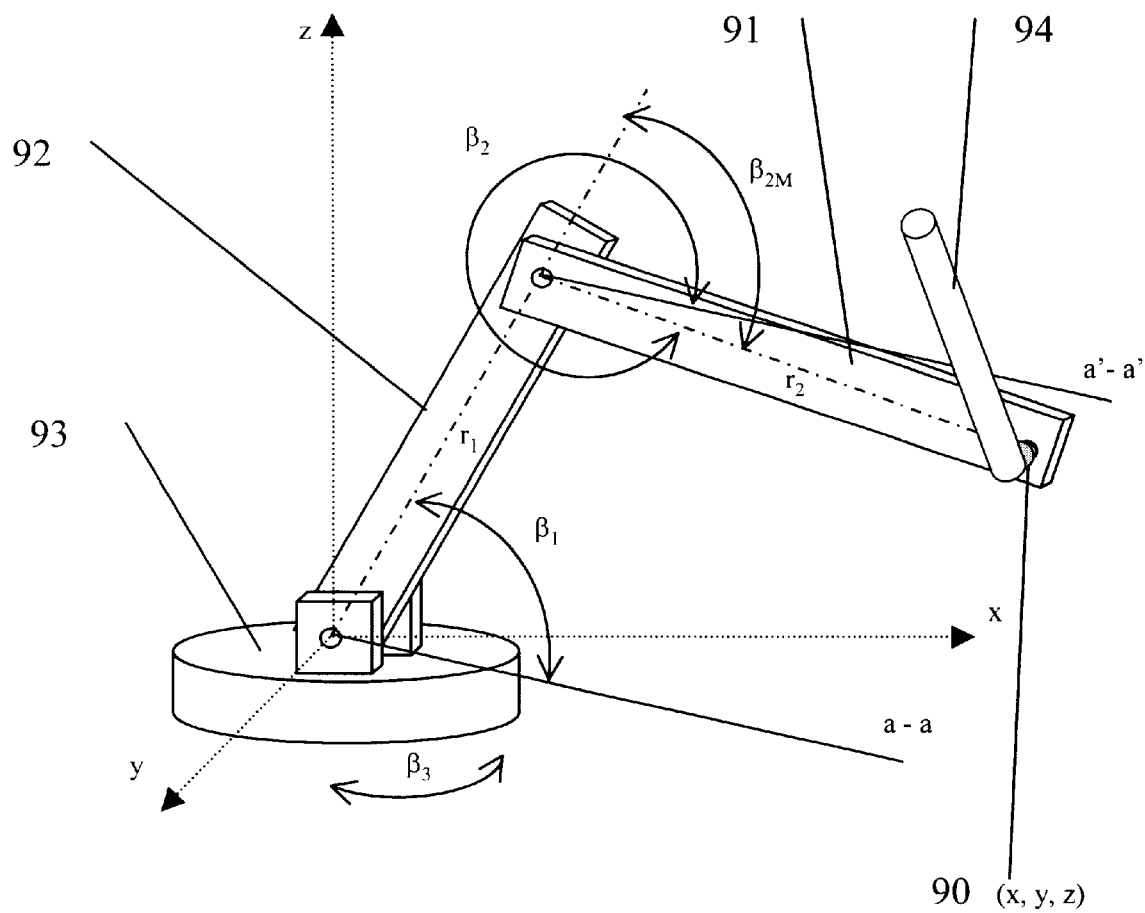
FIG. 11 shows a three revolute joint embodiment of the invention.

As an illustrative example, we shall consider a three revolute joint (RRR) haptic interface. The example interface has the kinematic structure given in FIG. 11. In this figure the details of each actuator are omitted for clarity, but each actuator would take the form of that shown in FIGS. 9–10. In this type of haptic interface a single position is represented in the slave environment and the position represented is controlled by the position of point 90 shown in FIG. 11. It is well known in the art of single point representation haptic interfaces to attach a pen shaped link 94 to the represented point for easy connection to the operator. The pen link 94 is connected to the most distal link 91 at point 90 by a ball and socket joint in FIG. 11 representing three uncontrolled degrees of freedom, or alternatively could be connected by any joint that represents the desired number of uncontrolled degrees of freedom. For this example three controlled (or represented) degrees of freedom are represented by the position of point 90 through the use of three links indicated as 91, 92 and 93. Link 93 is pivotally connected to a fixed reference point (e.g. a desk or floor of a room), while link 92 is pivotally connected to link 93 at a proximal end and pivotally connected to link 91 at a distal end. Link 91 is pivotally connected to link 92 at its proximal end and contains the represented point 90 at its distal end. Because this example represents a serial connection of links, the actuator for each distal link has an effective ground located on the next proximal link. For example, the actuator for controlling a force application to link 91 has a ground location (e.g. for mounting the motor) on link 92. Similarly the ground location for link 92 is in link 93 and the ground location for link 93 is an actual fixed location in reference to the operator of the device.

For the illustrated embodiment $\beta_2$ is calculated from the measured joint angle $\beta_{2M}$ by:

$$\beta_2=360°-\beta_{2M}+\beta_1 \quad [14]$$

Then the forward kinematics of the three DOF system are given by:

$$z=r_1 \sin \beta_1+r_2 \sin \beta_2 \quad [15]$$

$$y=(r_1 \cos \beta_1+r_2 \cos \beta_2)\sin \beta_3 \quad [16]$$

$$x=(r_1 \cos \beta_1+r_2 \cos \beta_2)\cos \beta_3 \quad [17]$$

Then in order to determine the pre-contact angles $\alpha_{Ai}$ and $\alpha_{Bi}$ for each joint (i=1, 2, 3), we are presented with a problem statement of:

Given: x, y, z, dx, dy, dz, $\beta_1$, $\beta_2$, $\beta_3$, $\beta_1'$, $\beta_2'$, $\beta_3'$ Find: $\alpha_{A1}$ or $\alpha_{B1}$, $\alpha_{A2}$ or $\alpha_{B2}$, $\alpha_{A3}$ or $\alpha_{B3}$ First we can determine whether we need to find $\alpha_{Ai}$ or $\alpha_{Bi}$, based on the sign of the most recent $\beta_i'$, and $\gamma_i$ will be determined as the contact disc control variable by EQS. [12–13] as discussed earlier. Then the solution for $\alpha_{Ai}$ or $\alpha_{Bi}$ is as follows. Considering the slave object edge position as having coordinates of (x+dx, y+dy, z+dz), we can describe each coordinate by:

$$z+dz=r_1 \sin(\beta_1+\alpha_1)+r_2 \sin(\beta_2+\alpha_2) \quad [18]$$

$$y+dy=(r_1 \cos(\beta_1+\alpha_1)+r_2 \cos(\beta_2+\alpha_2))\sin(\beta_3+\alpha_3) \quad [19]$$

$$x+dx=(r_1 \cos(\beta_1+\alpha_1)+r_2 \cos(\beta_2+\alpha_2))\cos(\beta_3+\alpha_3) \quad [20]$$

EQ. [18] expands to:

$$z+dz=r_1[(\sin \beta_1)(\cos \alpha_1)+(\cos \beta_1)(\sin \alpha_1)]+r_2[(\sin \beta_2)(\cos \alpha_2)+(\cos \beta_2)(\sin \alpha_2)] \quad [21]$$

Because dx, dy, and dz are small displacements, $\alpha_1$, $\alpha_2$, and $\alpha_3$ are small angles, thus it is reasonable to assume $\cos \alpha \approx 1$ and $\sin \alpha \cong \alpha$ (in radians). Making this substitution we arrive at:

$$z+dz=r_1(\sin \beta_1)+r_2(\sin \beta_2)+\alpha_1 r_1(\cos \beta_1)+\alpha_2 r_2(\cos \beta_2) \quad [22]$$

From which we can subtract z from the left side and the expression for z from the right side resulting in:

$$dz=\alpha_1 r_1(\cos \beta_1)+\alpha_2 r_2(\cos \beta_2) \quad [23]$$

Which can be rearranged as:

$$\alpha_1=[dz-\alpha_2 r_2(\cos \beta_2)]/[r_1(\cos \beta_1)] \quad [24]$$

Dividing EQ. [19] by EQ. [20] we arrive at:

$$[(y+dy)/(x+dx)]=[\sin(\beta_3+\alpha_3)]/[\cos(\beta_3+\alpha_3)] \quad [25]$$

That can be routinely solved for:

$$\alpha_3=\tan^{-1}[(y+dy)/(x+dx)]-\beta_3 \quad [26]$$

Expanding EQ. [20] we have:

$$x+dx=[(r_1 \cos \beta_1)\cos \alpha_1-(r_1 \sin \beta_1)\sin \alpha_1]\cos(\beta_3+\alpha_3)+[r_2(\cos \beta_2)\cos \alpha_2-r_2(\sin \beta_2)\sin \alpha_2]\cos(\beta_3+\alpha_3) \quad [27]$$

Again making the substitution of $\cos \alpha \cong 1$ and $\sin \alpha \cong \alpha$, we have:

$$x+dx=[(r_1 \cos \beta_1)-(r_1 \sin \beta_1)\alpha_1]\cos(\beta_3+\alpha_3)+[r_2(\cos \beta_2)-r_2(\sin \beta_2)\alpha_2]\cos(\beta_3+\alpha_3) \quad [28]$$

Which can be rearranged to:

$$\alpha_1=[-1/(r_1 \sin \beta_1)]\{[(x+dx)/(\cos(\beta_3+\alpha_3))]-[(r_1 \cos \beta_1)+r_2(\cos \beta_2)]-[r_2(\sin \beta_2)\alpha_2]\} \quad [29]$$

Equating EQ. [24] and EQ. [29] we can solve for:

$$\alpha_2 = \{[-(r_1 \cos\beta_1)(x+dx)]/[\cos(\beta_3+\alpha_3)] + [(r_1 \cos\beta_1)+r_2(\cos\beta_2)](r_1 \cos\beta_1) - [dz(r_1(\sin\beta_1)]\}/ \{r_2(\sin\beta_2)(r_1\cos\beta_1)-r_2(\cos\beta_2)(r_1\sin\beta_1)\} \quad [30]$$

From which we can then sequentially solve EQ. [26] for $\alpha_3$ then solve EQ. [30] for $\alpha_2$ and then solve EQ. [24] for $\alpha_1$ to arrive at all pre-contact angles $\alpha_i$. Though EQS. [26], [30], and [24] may appear to be computationally expensive due to the large number of sine and cosine function calls, many of these values are required for the forward kinematics solution and thus need only be calculated once.

Because the control algorithms for both the prismatic and revolute joints call for a control switching methodology, it would also be possible to implement a motor brake (together with the motor as an actuator or force generation means), thus permitting extremely high forces of contact with rigid surfaces. The use of a brake would allow for the very high rigid surface contact forces, without adding a risk to the operator (in the event of component failure) as would be present if higher torque motors were implemented to achieve the same result. Brakes can be controlled to engage only under pre-contact conditions described by EQS. [10]–[13] and such that for example: $G_x=G_x^*=B_x-dx_B^*-d$ and $\gamma=\gamma^*=\beta-\delta-\alpha_B$. For which the error can be controlled by engaging the brake(s) only when both the above conditions of close proximity pre-contact freeze and the condition of positional error is less than a predetermined amount $\epsilon$. The second condition can be stated as:

$$G_x(t)-G_x(t-1)<\epsilon$$

or $$\gamma(t)-\gamma(t-1)<\epsilon \quad [30]$$

As an alternative to the motor brake, any other type of brake could be used such as a caliper brake for example.

In another embodiment, it may be desirable to combine the elements of multiple joint linkages, including any combination of revolute and prismatic joints described thus far into a complete haptic interface for force display. It is well within the scope of the present invention to make such combinations in light of the present teaching. Such a combination would utilize the independent actuator position control with selective contact with a linkage system, resulting in improved haptic interface stability and improved time response in display of contact forces. In yet another embodiment a multi-link mechanism constructed according to the present teaching (for example that shown in FIG. 11) may be combined with a multi-finger mechanism as shown in FIG. 1. Alternatively, bilateral gripping device such as a tongs or tweezers may be attached to the represented point of motion 90 shown in FIG. 11.

While the invention has been described and disclosed in connection with certain preferred embodiments and procedures, it is not intended to limit the invention to those specific embodiments. Rather it is intended to cover all such alternative embodiments and modifications as fall within the spirit and scope of the invention.

I claim as my invention:

1. A force display master interface device for teleoperation wherein the master interface device is used by an operator for simulating interaction between a slave entity and an object in the slave environment, the master interface device comprising:
   linkage means for connection to the operator and for selectively providing resistance to operator motion,
   force generation means operatively connected to said linkage means for generation of a force and application of the force to said linkage means;
   whereby the operative connection between said linkage means and said force generation means includes;
   a state of physical contact whereby the force generation means provides the force to the linkage means resulting in resistance to operator motion, said state of physical contact occurring in response to the slave entity contact with the object,
   a maximum offset distance between said linkage means and said force generation means in response to the slave entity separation from the object by more than a predetermined distal separation distance,
   and at least one intermediate offset distance between said linkage means and said force generation means in response to the slave entity separation from the object by less than at least one predetermined proximal separation distance.

2. The device set forth in claim 1 comprising a multitude of predetermined intermediate offset distances and a multitude of corresponding predetermined proximal separation distances, whereby each intermediate offset distance is proportional to the corresponding proximal separation distance.

3. The device set forth in claim 1 whereby the operative connection includes a plurality of offset distances between said linkage means and said force generation means, whereby each offset distance is proportional to one of a plurality of separation distances between the slave entity and the object.

4. A force display master interface device for teleoperation wherein the master interface device is used by an operator for simulating interaction between a slave entity and an object in the slave environment, the master interface device comprising:

resistive means for an operative connection to an operator and for providing resistance to operator motion, whereby the operative connection between said operator and said resistive means includes;

a resistance condition where the resistive means provides resistance to operator motion in response to the slave entity contact with the object, a maximum displacement condition whereby resistive means does not provide resistance to operator motion and operator displacement by a first distance results in said resistance condition, and said maximum displacement condition is realized in response to the slave entity separation from the object by more than a first predetermined separation distance, and at least one intermediate displacement condition whereby resistive means does not provide resistance to operator motion and operator displacement by a second distance results in said resistance condition, and said intermediate displacement condition is realized in response to the slave entity separation from the object by less than at least one second predetermined separation distance.

5. The device set forth in claim 4 wherein resistive means further comprises a linkage means and an actuation means, whereby the operative connection between the operator and the resistive means occurs between the actuation means and the linkage means.

6. The device set forth in claim 5 wherein the linkage means comprises a plurality of interconnected links and the actuation means comprises a plurality if actuators, whereby each actuator forms an operative connection with a link.

7. The device set forth in claim 6 wherein each link represents one degree of freedom in the motion represented by the device.

8. The device set forth in claim 6 wherein each actuator represents one degree of freedom in the motion represented by the device.

9. The device set forth in claim 4 including a multitude of intermediate displacement conditions;

whereby the resistive means does not provide resistance to operator motion, and operator displacement by a multitude of predetermined second distances results in said resistance condition, and said intermediate displacement conditions are proportional to the second predetermined separation distances.

10. A force display master interface device for teleoperation wherein the master interface device is used by an operator for simulating interaction between a slave entity and an object in the slave environment, the master interface device comprising:

linkage means for connection to the operator and for providing a sensation signal to the operator, signal generation means for generation of the sensation signal and selective transfer of the sensation signal to the linkage means, whereby the selective transfer includes;

a contact state between the signal generation means and the linkage means applied in response to slave entity contact with the object, a pre-contact state between the signal generation means and the linkage means in response to a separation distance between the slave entity and the object, whereby the pre-contact state includes;

controlling the magnitude of the signal delivered by the signal generation means to be one of a plurality of predetermined values.

11. The device set forth in claim 10 wherein the signal generation means is an actuator for producing a position signal in response to an electric signal, the position signal is the sensation signal.

12. The device set forth in claim 11 wherein the pre-contact state includes fixing the position of the actuator relative to its ground location in response to a predetermined proximal separation distance between the slave entity and the object.

13. The device set forth in claim 10 wherein the signal generation means includes means for producing a force, and the force is the sensation signal.

14. The device set forth in claim 10 wherein the signal generation means includes at least two contact surfaces including a first contact surface and a second contact surface, and the pre-contact state includes; selective control of the distance between the first contact surface and the linkage means in response to operator motion in a first direction, and selective control of the distance between the second contact surface and the linkage means in response to operator motion in a second direction.

15. A device for force display to human operators, to simulate forces experienced by a slave entity while interacting with a slave object, including;

operator position measurement means, slave control means for controlling the slave entity position to follow displacements proportional to the operator displacements, slave contact means for activation when the slave entity and the slave object are in contact and deactivation otherwise, slave proximity means for activation when the slave object is within a predetermined distance from the slave entity and deactivation otherwise, linkage means for transmitting a force to the operator, actuator means for generation of the force, actuator control means for controlling the actuator to assume a position offset from the linkage means by an offset distance, whereby the offset distance is controlled to assume one of a plurality of predetermined offset distances, in response to the slave proximity means.

16. The device set forth in claim 15 whereby the offset distance includes;

a zero distance in response to the slave contact means activation, a predetermined maximum distance in response to slave proximity means deactivation, at least one intermediate distance in response to slave proximity means activation.

17. The device set forth in claim 15 whereby the slave proximity means includes means for determination of a separation distance between the slave entity and the slave object while in the activation state, whereby the offset distance is proportional to the separation distance.

* * * * *